April 25, 1939.  E. O. BENNETT  2,155,635

BOTTOM HOLE PRESSURE GAUGE

Filed May 2, 1938

INVENTOR
Edwin O. Bennett
BY Thos. E. Deofield
ATTORNEY

Patented Apr. 25, 1939

2,155,635

UNITED STATES PATENT OFFICE 2,155,635

BOTTOM HOLE PRESSURE GAUGE

Edwin O. Bennett, Ponca City, Okla., assignor to Continental Oil Company, Ponca City, Okla., a corporation of Delaware Application May 2, 1938, Serial No. 205,491

1 Claim. (Cl. 73—300)

My invention relates to a bottom hole pressure gauge and more particularly to a gauge for measuring pressures at the bottom of deep wells.

It frequently becomes necessary to determine pressures in the bottom of deep oil wells. These pressures are often in excess of 5,000 pounds per square inch. The gauges must be of small diameter to permit their being introduced into the well through small tubing. The pressure gauges of the prior art are usually built with spring recording mechanisms and are of very delicate and fragile construction due to the small dimensions existing. The instruments are very expensive and extremely difficult to keep in repair. Variations in temperature have marked effect upon the calibration of gauges of the spring type and all pressures must be corrected for temperature. Temperatures of 175° F. require corrections as high as 120 pounds per square inch to the recorded pressures.

One object of my invention is to provide a simple bottom hole pressure gauge.

Another object of my invention is to provide a positive and accurate pressure gauge adapted to measure and record bottom hole pressures, which gauge is not susceptible to temperature changes.

Another object of my invention is to provide a bottom hole pressure gauge of rugged construction so that no injury will result to the gauge if it should be dropped or left in the well.

Other and further objects of my invention will appear from the following description.

In the accompanying drawing which forms part of the instant specification and is to be read in conjunction therewith, and in which like reference numerals are used to indicate like views in the various parts:

Figure 1:
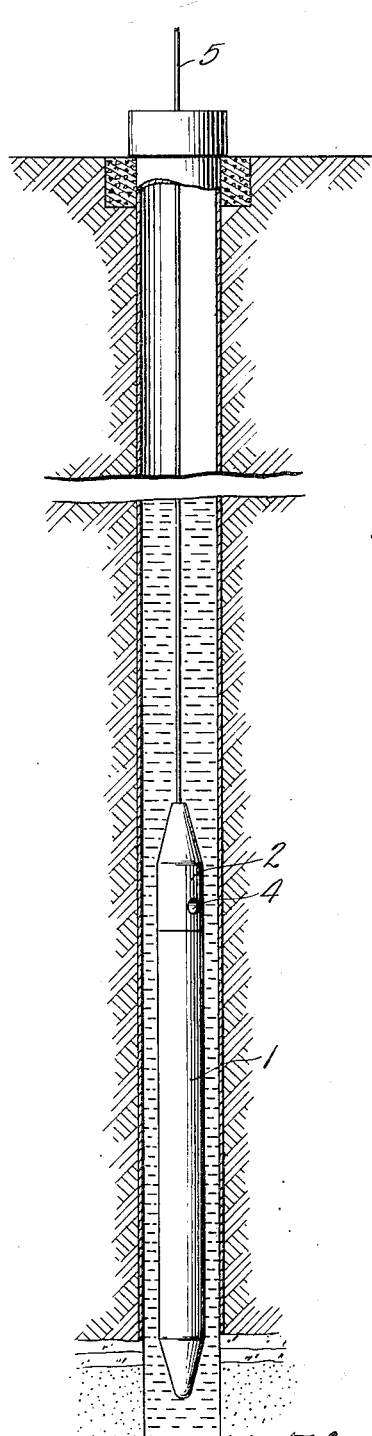
Figure 1 is a diagrammatic view of an oil well showing my gauge in position.
Figure 2:
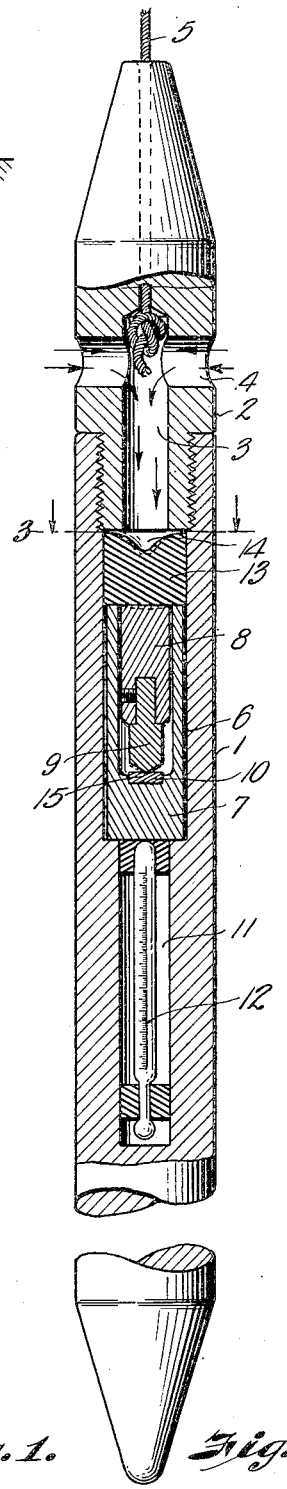
Figure 2 is a sectional view of my gauge on an enlarged scale.
Figure 3:
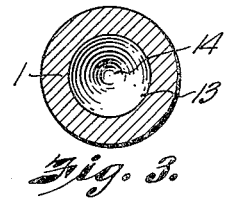
Figure 3 is a sectional view taken on a line 3—3 of Figure 2.
Figure 4:
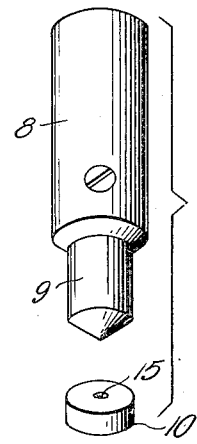
Figure 4 is a perspective view of the gauge plunger and impression block removed from the gauge.
Figure 5:
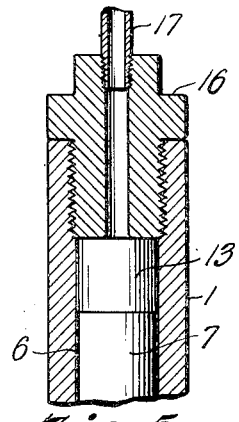
Figure 5 is a sectional view of my gauge fitted with a test plug for testing the operation of the gauge.

More particularly referring now to the drawing, the gauge comprises a body portion 1 fitted with a threaded top 2 provided with a central bore 3 and laterally communicating bore 4 through which fluid under pressure in the well is adapted to act upon the recording mechanism proper.

The top 2 is drilled to receive a wire line 5 by which the gauge is lowered into the well. The body portion 1 is provided with a recess 6 in which the gauge carrier 7 containing the gauge plunger 8, the gauge point 9 and the gauge impression block 10 are housed. The body portion 1 is also provided with a recess 11, in which a thermometer 12 is mounted. Above the gauge carrier 7 I position a piston 13. The piston is of oil resistant material and is preferably elastic. It is provided with a concave top 14 so that, when fluid pressure acts through the bores 4 and 3, the piston will form a leakproof seal against the interior walls of the recess 6. Pressure communicated to the top of piston 13 will act upon plunger 8, which carries the gauge point 9 which rests upon the impression block 10. The gauge point 9 may be of any suitable hard material, such as carbon content steels, hard alloy steels, flint, diamond or the like. The impression block 10 may be made out of any suitable material such as lead, aluminum, copper, silver, zinc, or suitable alloys.

The pressure acting through the piston 13 and the plunger 8, the shape of the gauge point 9 and the hardness of the impression block 10 will govern the amount and size of the impression produced. The shape of the gauge point and the hardness of the impression block 10 may be controlled to fit the requirements at hand.

The thermometer 12 is a maximum temperature thermometer and is used merely to determine subsurface temperatures. The hardness of the impression block 10 or the shape of the gauge point 9 is not affected by the temperatures encountered so that no temperature correction is necessary with my gauge.

After the gauge has been lowered into the well by means of cable 5, the gauge is removed from the well and the diameter of the impression 15 is measured under a microscope. It is this diameter for a given metal for impression block 10 and a given shape of the gauge point 9 which is a measure of the pressure which caused the impression. To calibrate the gauge, the top 2 is removed and a test block 16 containing a test pipe 17 is connected. Pressure is placed upon the piston 13 and the pressure measured with a dead weight gauge, the fresh impression blocks 10 being placed in the gauge through a series of pressures. Since the impression blocks are of uniform texture, constant results will be obtained.

It will be observed that I have accomplished the objects of my invention. I have provided a simple, rugged, inexpensive and accurate gauge adapted to measure pressures encountered at the bottom of a well in an accurate and convenient manner. Not only will the impression blocks measure the pressure but they actually record the pressure which exists.

It will be understood that certain features and sub-combinations are of utility and may be employed without reference to other features and sub-combinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, I claim:

A deep well pressure gauge comprising in combination a body member provided with a bore, a housing in said bore, an anvil of deformable metal seated in said housing, a plunger provided with a point of hard metal resting upon said anvil, a piston contacting said plunger and means providing communication between the exterior of said body member and the top of said piston, the construction being such that fluid pressure acting against said piston is adapted to move said plunger and its point into said deformable anvil, the extent of deformation indicating pressure.

EDWIN O. BENNETT.